(12) United States Patent
Huang et al.

(10) Patent No.: US 10,104,535 B2
(45) Date of Patent: Oct. 16, 2018

(54) MOBILE TERMINAL, MAINTENANCE SERVER, AND METHOD AND APPARATUS FOR MAINTAINING VIRTUAL SIM CARD

(71) Applicant: Huawei Technologies Co., Ltd., Shenzhen (CN)

(72) Inventors: Chaozhi Huang, Shenzhen (CN); Li Zhu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/562,778

(22) PCT Filed: Apr. 9, 2015

(86) PCT No.: PCT/CN2015/076182
§ 371 (c)(1),
(2) Date: Sep. 28, 2017

(87) PCT Pub. No.: WO2016/161604
PCT Pub. Date: Oct. 13, 2016

(65) Prior Publication Data
US 2018/0220293 A1    Aug. 2, 2018

(51) Int. Cl.
*H04M 3/00* (2006.01)
*H04W 8/18* (2009.01)
(Continued)

(52) U.S. Cl.
CPC .......... *H04W 8/183* (2013.01); *H04W 8/205* (2013.01); *H04W 8/22* (2013.01)

(58) Field of Classification Search
CPC .................................................... H04W 8/183
(Continued)

(56) References Cited

U.S. PATENT DOCUMENTS

2011/0086670 A1    4/2011  Shin
2013/0303122 A1   11/2013  Li et al.
(Continued)

FOREIGN PATENT DOCUMENTS

CN    102236530 A    11/2011
CN    102917339 A     2/2013
(Continued)

OTHER PUBLICATIONS

Richarme, M., "The Virtual SIM, A Feasibility Study," XP055199861, Apr. 21, 2008, 158 pages.
(Continued)

*Primary Examiner* — Joel Ajayi
(74) *Attorney, Agent, or Firm* — Conley Rose, P.C.

(57) ABSTRACT

A mobile terminal, a maintenance server, a method and an apparatus for maintaining a virtual subscriber identity module (SIM) card, where the method includes checking that a physical SIM card is inserted into a physical SIM card slot, switching a SIM card in a working state from the virtual SIM card to the physical SIM card using a SIM card switching switch, accessing a carrier network using the physical SIM card, receiving maintenance data sent by a maintenance server to the physical SIM card, and maintaining the virtual SIM card according to the maintenance data. Hence, after data of a virtual SIM card is damaged, the virtual SIM card can still be maintained without returning the virtual SIM card to a manufacturer for repair.

9 Claims, 9 Drawing Sheets

(51) Int. Cl.
*H04W 8/20* (2009.01)
*H04W 8/22* (2009.01)

(58) Field of Classification Search
USPC .......................................................... 455/418
See application file for complete search history.

(56) References Cited

U.S. PATENT DOCUMENTS

2015/0215773 A1   7/2015   Bai et al.
2017/0156051 A1   6/2017   Park et al.

FOREIGN PATENT DOCUMENTS

| CN | 103415017 A | 11/2013 |
| CN | 104159214 A | 11/2014 |
| KR | 20110040073 A | 4/2011 |
| WO | 2012147722 A1 | 12/2012 |

OTHER PUBLICATIONS

Foreign Communication From a Counterpart Application, European Application No. 15888161.5, Extended European Search Report dated Jan. 4, 2018, 11 pages.
Machine Translation and Abstract of Chinese Publication No. CN102236530, Nov. 9, 2011, 18 pages.
Machine Translation and Abstract of Chinese Publication No. CN103415017, Nov. 27, 2013, 13 pages.
Machine Translation and Abstract of Chinese Publication No. CN104159214, Nov. 19, 2014, 16 pages.
Foreign Communication From a Counterpart Application, PCT Application No. PCT/CN2015/076182, English Translation of International Search Report dated Jan. 7, 2016, 2 pages.
Foreign Communication From a Counterpart Application, PCT Application No. PCT/CN2015/076182, English Translation of Written Opinion dated Jan. 7, 2016, 5 pages.
Machine Translation and Abstract of Korean Publication No. KR20110040073, Apr. 20, 2011, 15 pages.
Foreign Communication From a Counterpart Application, Korean Application No. 10-2017-7027025, Korean Notice of Allowance and Brief Translation dated Apr. 30, 2018, 3 pages.

MOBILE TERMINAL, MAINTENANCE SERVER, AND METHOD AND APPARATUS FOR MAINTAINING VIRTUAL SIM CARD

CROSS-REFERENCE TO RELATED APPLICATION

This application is a U.S. National Stage of International Patent Application No. PCT/CN2015/076182 filed on Apr. 9, 2015, which is hereby incorporated by reference in its entirety.

TECHNICAL FIELD

The present disclosure relates to the field of wireless communications, and in particular, to a mobile terminal, a maintenance server, and a method and an apparatus for maintaining a virtual subscriber identity module (SIM) card

BACKGROUND

A virtual SIM card is a solution in which a SIM function is implemented using software. Generally, overall stability and consistency of a mobile device using the virtual SIM card are better than those of a mobile terminal using a physical SIM card, and hardware costs can be reduced.

In other approaches, when a virtual SIM card in a mobile terminal is damaged, a user needs to return the mobile terminal to a manufacturer or a merchant, and the mobile terminal is repaired or replaced entirely by the manufacturer or the merchant.

During implementation of the present disclosure, the inventor finds that the other approaches has at least the following problems, where when a virtual SIM card is damaged, a user can return only a mobile terminal using the virtual SIM card to a manufacturer to repair the mobile terminal or to replace the whole machine, and as a result, maintenance costs are high, and a maintenance interval is long.

SUMMARY

To resolve problems that maintenance costs are high and a maintenance interval is long for an existing virtual SIM card, embodiments of the present disclosure provide a mobile terminal, a maintenance server, and a method and an apparatus for maintaining a virtual SIM card. The technical solutions are as follows.

According to a first aspect, a mobile terminal is provided, where the mobile terminal supports both a virtual SIM card and a physical SIM card, and includes a processor, a communications chip connected to the processor, and a SIM card circuit connected to the communications chip, where the SIM card circuit includes a SIM card switching switch and a physical SIM card slot. The SIM card circuit is configured to check that the physical SIM card is inserted into the physical SIM card slot. The SIM card circuit is configured to switch a SIM card in a working state from the virtual SIM card to the physical SIM card using the SIM card switching switch. The communications chip is configured to access a carrier network using the physical SIM card. The communications chip is configured to receive maintenance data that has a fixed format and that is sent by a maintenance server to the physical SIM card, where the maintenance data includes an identifier field, and the identifier field is used to identify that the maintenance data is maintenance data of the virtual SIM card, and the processor is configured to maintain the virtual SIM card according to the maintenance data.

With reference to the first possible implementation manner of the first aspect, in a second possible implementation manner, the mobile terminal further includes the maintenance data, which is a short message service message having a fixed format, where the short message service message carries the identifier field and a maintenance field. The processor is further configured to detect that the short message service message having the fixed format includes the identifier field, forward the short message service message to a virtual SIM card maintenance program according to the identifier field, decode content of the short message service message using the virtual SIM card maintenance program to obtain the maintenance field, and maintain the virtual SIM card according to the maintenance field.

With reference to the first aspect, or the first or the second possible implementation manner of the first aspect, in a third possible implementation manner, the communications chip is further configured to send a maintenance request to the maintenance server using the physical SIM card, where the maintenance request includes an identifier of the virtual SIM card and an identifier of the physical SIM card, where the identifier of the virtual SIM card is used by the maintenance server to send maintenance data corresponding to the identifier of the virtual SIM card to the mobile terminal corresponding to the physical SIM card, and the identifier of the physical SIM card is used by the maintenance server to send the maintenance data to the mobile terminal corresponding to the identifier of the physical SIM card.

With reference to the first aspect, or the first or the second or the third possible implementation manner of the first aspect, in a fourth possible implementation manner, the SIM card circuit is further configured to check that the physical SIM card is removed from the physical SIM card slot, switch the SIM card in the working state from the physical SIM card to the virtual SIM card using the SIM card switching switch, and the communications chip is further configured to access the carrier network using the virtual SIM card.

According to a second aspect, a maintenance server is provided, where the maintenance server includes a processor and a communications board connected to the processor, where the communications board is configured to receive a maintenance request sent by a mobile terminal or a computer, where the maintenance request includes an identifier of a virtual SIM card and an identifier of a physical SIM card. The processor is configured to determine, according to the identifier of the virtual SIM card, maintenance data that needs to be sent and that has a fixed format, where the maintenance data includes an identifier field, the identifier field is used to identify that the maintenance data is maintenance data of the virtual SIM card, and the communications board is further configured to send the maintenance data to the mobile terminal corresponding to the identifier of the physical SIM card.

With reference to the first possible implementation manner of the second aspect, in a second possible implementation manner, the processor is further configured to read maintenance data corresponding to the identifier of the virtual SIM card from a database, where the maintenance data is a short message service message having a fixed format, the short message service message carries the identifier field and a maintenance field, and the maintenance field is used by the mobile terminal to maintain the virtual SIM card, and the processor is further configured to determine that the maintenance data corresponding to the identifier of the virtual SIM card is the maintenance data that needs to be sent and that has the fixed format.

According to a third aspect, a method for maintaining a virtual SIM card is provided, supporting both a virtual SIM card and a physical SIM card, where the method includes checking that the physical SIM card is inserted into the physical SIM card slot, switching a SIM card in a working state from the virtual SIM card to the physical SIM card using a SIM card switching switch, assessing the carrier network using the physical SIM card, receiving maintenance data that has a fixed format and that is sent by a maintenance server to the physical SIM card, where the maintenance data includes an identifier field, and the identifier field is used to identify that the maintenance data is maintenance data of the virtual SIM card, and maintaining the virtual SIM card according to the maintenance data.

With reference to the first possible implementation manner of the third aspect, in a second possible implementation manner, the maintenance data is a short message service message having a fixed format, where the short message service message carries the identifier field and a maintenance field, and maintaining the virtual SIM card according to the maintenance data includes detecting that the short message service message having the fixed format includes the identifier field, forwarding the short message service message to a virtual SIM card maintenance program according to the identifier field, decoding content of the short message service message using the virtual SIM card maintenance program, to obtain the maintenance field, and maintaining the virtual SIM card according to the maintenance field.

With reference to the third aspect or the first or the second possible implementation manner of the third aspect, in a third possible implementation manner, before receiving, using the physical SIM card, maintenance data that has a fixed format and that is sent by a maintenance server, the method includes sending a maintenance request to the maintenance server using the physical SIM card, where the maintenance request includes an identifier of the virtual SIM card and an identifier of the physical SIM card, where the identifier of the virtual SIM card is used by the maintenance server to send maintenance data corresponding to the identifier of the virtual SIM card to a mobile terminal corresponding to the physical SIM card, and the identifier of the physical SIM card is used by the maintenance server to send the maintenance data to the mobile terminal corresponding to the identifier of the physical SIM card.

With reference to the third aspect or the first or the second or the third possible implementation manner of the third aspect, in a fourth possible implementation manner, after maintaining the virtual SIM card according to the maintenance data, the method further includes checking that the physical SIM card is removed from the physical SIM card slot, switching the SIM card in the working state from the physical SIM card to the virtual SIM card using the SIM card switching switch, and assessing the carrier network using the virtual SIM card.

According to a fourth aspect, a method for maintaining a virtual SIM card is provided, where the method includes receiving a maintenance request sent by a mobile terminal or a computer, where the maintenance request includes an identifier of a virtual SIM card and an identifier of a physical SIM card, determining, according to the identifier of the virtual SIM card, maintenance data that needs to be sent and that has a fixed format, where the maintenance data includes an identifier field, and the identifier field is used to identify that the maintenance data is maintenance data of the virtual SIM card, and sending the maintenance data to the mobile terminal corresponding to the identifier of the physical SIM card.

With reference to the first possible implementation manner of the fourth aspect, in a second possible implementation manner, determining, according to the identifier of the virtual SIM card, maintenance data that needs to be sent and that has a fixed format includes reading maintenance data corresponding to the identifier of the virtual SIM card from a database, where the maintenance data is a short message service message having a fixed format, the short message service message carries the identifier field and a maintenance field, and the maintenance field is used by the mobile terminal to maintain the virtual SIM card, and determining that the maintenance data corresponding to the identifier of the virtual SIM card is the maintenance data that needs to be sent and that has the fixed format.

According to a fifth aspect, an apparatus for maintaining a virtual SIM card is provided, supporting both a virtual SIM card and a physical SIM card, where the apparatus includes a check module configured to check that the physical SIM card is inserted into the physical SIM card slot, a switching module configured to switch a SIM card in a working state from the virtual SIM card to the physical SIM card using a SIM card switching switch, a network accessing module configured to access the carrier network using the physical SIM card, a receiving module configured to receive maintenance data that has a fixed format and that is sent by a maintenance server to the physical SIM card, where the maintenance data includes an identifier field, and the identifier field is used to identify that the maintenance data is maintenance data of the virtual SIM card, and a maintenance module configured to maintain the virtual SIM card according to the maintenance data.

With reference to the first possible implementation manner of the fifth aspect, in a second possible implementation manner, the maintenance data is a short message service message having a fixed format, where the short message service message carries the identifier field and a maintenance field, and the maintenance module includes an identifier detection unit configured to detect that the short message service message having the fixed format includes the identifier field, an information forwarding unit configured to forward the short message service message to a virtual SIM card maintenance program according to the identifier field, a content decoding unit configured to decode content of the short message service message using the virtual SIM card maintenance program to obtain the maintenance field, and a data maintenance unit configured to maintain the virtual SIM card according to the maintenance field.

With reference to the fifth aspect or the first or the second possible implementation manner of the fifth aspect, in a third possible implementation manner, the apparatus includes a request sending module configured to send a maintenance request to the maintenance server using the physical SIM card, where the maintenance request includes an identifier of the virtual SIM card and an identifier of the physical SIM card, where the identifier of the virtual SIM card is used by the maintenance server to send maintenance data corresponding to the identifier of the virtual SIM card to a mobile terminal corresponding to the physical SIM card, and the identifier of the physical SIM card is used by the maintenance server to send the maintenance data to the mobile terminal corresponding to the identifier of the physical SIM card.

With reference to the fifth aspect or the first or the second or the third possible implementation manner of the fifth aspect, in a fourth possible implementation manner, the apparatus includes a SIM card detection module configured to check that the physical SIM card is removed from the physical SIM card slot, a network switching module configured to switch the SIM card in the working state from the physical SIM card to the virtual SIM card using the SIM card switching switch, and a network access module configured to access the carrier network using the virtual SIM card.

According to a sixth aspect, an apparatus for maintaining a virtual SIM card is provided, where the apparatus includes a request receiving module configured to receive a maintenance request sent by a mobile terminal or a computer, where the maintenance request includes an identifier of a virtual SIM card and an identifier of a physical SIM card, a data determining module configured to determine, according to the identifier of the virtual SIM card, maintenance data that needs to be sent and that has a fixed format, where the maintenance data includes an identifier field, and the identifier field is used to identify that the maintenance data is maintenance data of the virtual SIM card, and a data sending module configured to send the maintenance data to the mobile terminal corresponding to the identifier of the physical SIM card.

With reference to the first possible implementation manner of the sixth aspect, in a second possible implementation manner, the data determining module includes a data reading unit configured to read maintenance data corresponding to the identifier of the virtual SIM card from a database, where the maintenance data is a short message service message having a fixed format, the short message service message carries the identifier field and a maintenance field, and the maintenance field is used by the mobile terminal to maintain the virtual SIM card, and a data determining unit configured to determine that the maintenance data corresponding to the identifier of the virtual SIM card is the maintenance data that needs to be sent and that has the fixed format.

The technical solutions provided in the embodiments of the present disclosure have the following beneficial effects.

A mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
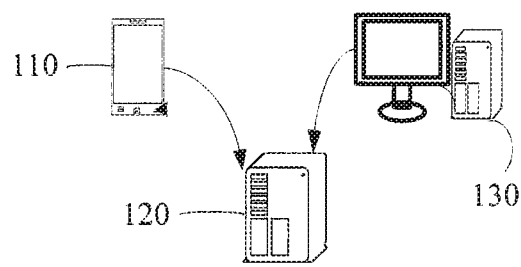
FIG. 1 is a schematic architectural diagram of a maintenance system according to embodiments of the present disclosure.

Referring to FIG. 1, FIG. 1 is a schematic architectural diagram of a maintenance system according to embodiments of the present disclosure. The maintenance system includes a mobile terminal 110, a maintenance server 120, and a computer 130.

The mobile terminal 110 is a mobile terminal supporting both a virtual SIM card and a physical SIM card, and the mobile terminal 110 may be configured to send a maintenance request to the maintenance server 120, or receive maintenance data sent by the maintenance server 120. The physical SIM card may be a SIM card, a universal SIM (USIM) card, or the like. The virtual SIM card may be a SIM function (Soft SIM) implemented using a software method.

The maintenance server 120 is configured to receive the maintenance request sent by the mobile terminal 110 or the computer 130, or send the maintenance data to the mobile terminal 110.

The computer 130 is configured to send the maintenance request to the maintenance server 120, and the computer 130 may be a personal computer, a tablet computer, or the like.

It should be noted that, if one of the mobile terminal 110 and the computer 130 sends the maintenance request to the maintenance server 120, the other one does not need to send the maintenance request to the maintenance server 120.

Figure 2:
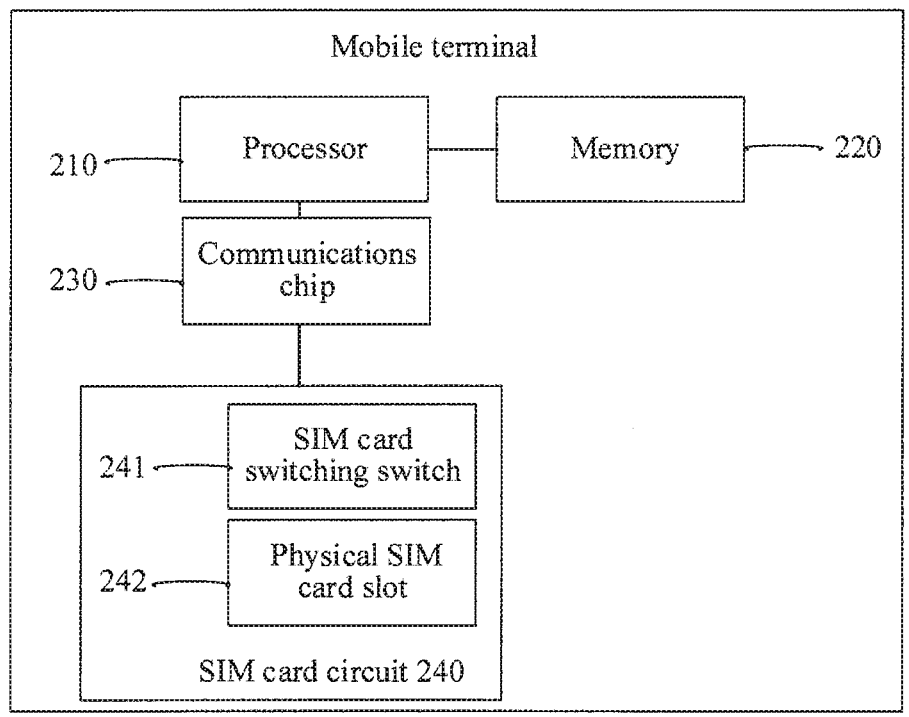
FIG. 2 is a schematic structural diagram of a mobile terminal according to an embodiment of the present disclosure.

Referring to FIG. 2, FIG. 2 is a schematic structural diagram of a mobile terminal according to an embodiment of the present disclosure. The mobile terminal supports both a virtual SIM card and a physical SIM card, and the mobile terminal includes a processor 210, a memory 220, a communications chip 230 connected to the processor 210, and a SIM card circuit 240 connected to the communications chip 230. The memory 220 stores one or more instructions, and the instruction is configured to be executed by the processor 210. The communications chip 230 refers to a combination of a baseband chip and a radio frequency chip. The SIM card circuit 240 includes a SIM card switching switch 241 and a physical SIM card slot 242.

The SIM card circuit 240 is configured to check that the physical SIM card is inserted into the physical SIM card slot 242.

The SIM card circuit 240 is configured to switch a SIM card in a working state from the virtual SIM card to the physical SIM card using the SIM card switching switch 241.

The communications chip 230 is configured to access a carrier network using the physical SIM card.

The communications chip 230 is configured to receive maintenance data that has a fixed format and that is sent by a maintenance server to the physical SIM card. The maintenance data includes an identifier field, and the identifier field is used to identify that the maintenance data is maintenance data of the virtual SIM card.

The processor 210 is configured to maintain the virtual SIM card according to the maintenance data.

To sum up, according to the mobile terminal provided in this embodiment, the mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Optionally, the maintenance data is a short message service message having a fixed format. The short message service message carries the identifier field and a maintenance field.

The processor 210 is further configured to detect that the short message service message having the fixed format includes the identifier field.

The processor 210 is further configured to forward the short message service message to a virtual SIM card maintenance program according to the identifier field.

The processor 210 is further configured to decode content of the short message service message using the virtual SIM card maintenance program to obtain the maintenance field.

The processor 210 is further configured to maintain the virtual SIM card according to the maintenance field.

Optionally, the communications chip 230 is further configured to send a maintenance request to the maintenance server using the physical SIM card. The maintenance request includes an identifier of the virtual SIM card and an identifier of the physical SIM card.

The identifier of the virtual SIM card is used by the maintenance server to send maintenance data corresponding to the identifier of the virtual SIM card to the mobile terminal corresponding to the physical SIM card.

The identifier of the physical SIM card is used by the maintenance server to send the maintenance data to the mobile terminal corresponding to the identifier of the physical SIM card.

Optionally, the SIM card circuit 240 is further configured to check that the physical SIM card is removed from the physical SIM card slot 242.

The SIM card circuit 240 is further configured to switch the SIM card in the working state from the physical SIM card to the virtual SIM card using the SIM card switching switch 241.

The communications chip 230 is further configured to access the carrier network using the virtual SIM card.

Figure 3:
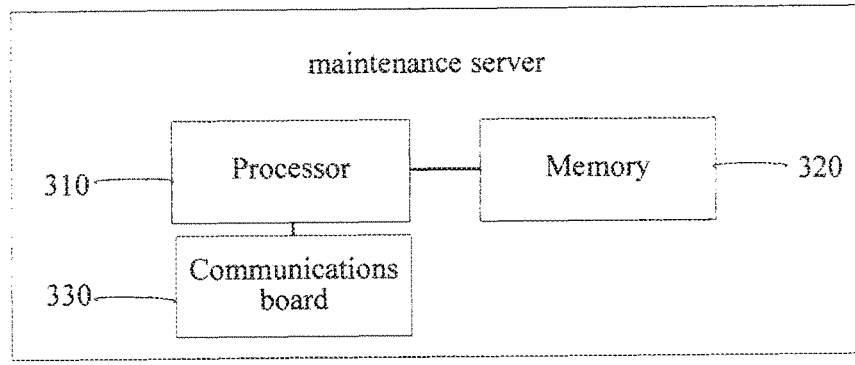
FIG. 3 is a schematic structural diagram of a maintenance server according to an embodiment of the present disclosure.

Referring to FIG. 3, FIG. 3 is a schematic structural diagram of a maintenance server according to an embodiment of the present disclosure. The maintenance server includes a processor 310, a memory 320, and a communications board 330 connected to the processor 310. The memory 320 stores one or more instructions, and the one or more instructions are configured to be executed by the processor 310, and the communications board 330 is an Ethernet network interface card or a wireless network interface card.

The communications board 330 is configured to receive a maintenance request sent by a mobile terminal or a computer. The maintenance request includes an identifier of a virtual SIM card and an identifier of a physical SIM card.

The processor 310 is further configured to determine, according to the identifier of the virtual SIM card, maintenance data that needs to be sent and that has a fixed format. The maintenance data includes an identifier field, and the identifier field is used to identify that the maintenance data is maintenance data of the virtual SIM card.

The communications board 330 is further configured to send the maintenance data to the mobile terminal corresponding to the identifier of the physical SIM card.

To sum up, according to the maintenance server provided in this embodiment, the mobile terminal accesses a network using a physical SIM card such that the mobile terminal may receive maintenance data sent by the maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Optionally, the processor 310 is further configured to read maintenance data corresponding to the identifier of the virtual SIM card from a database, where the maintenance data is a short message service message having a fixed format, the short message service message carries the identifier field and a maintenance field, and the maintenance field is used by the mobile terminal to maintain the virtual SIM card.

The processor 310 is further configured to determine that the maintenance data corresponding to the identifier of the virtual SIM card is the maintenance data that needs to be sent and that has the fixed format.

Figure 4:
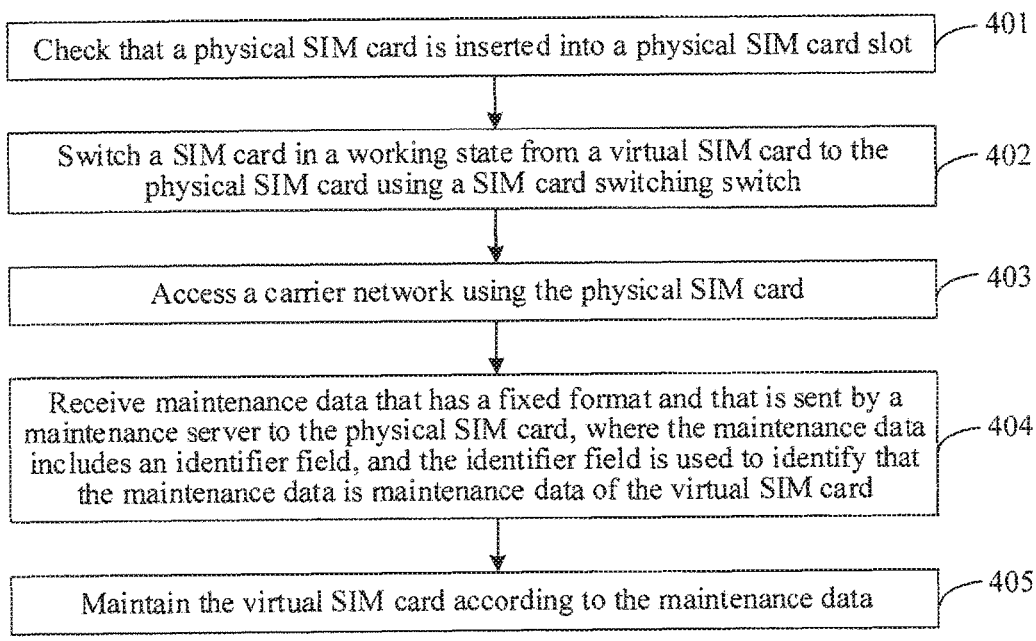
FIG. 4 is a method flowchart of a method for maintaining a virtual SIM card according to an embodiment of the present disclosure.

Referring to FIG. 4, FIG. 4 is a method flowchart of a method for maintaining a virtual SIM card according to an embodiment of the present disclosure. The method is applied to the mobile terminal shown in FIG. 1, and includes the following steps.

Step 401: Check that a physical SIM card is inserted into a physical SIM card slot.

Step 402: Switch a SIM card in a working state from the virtual SIM card to the physical SIM card using a SIM card switching switch.

Step 403: Access a carrier network using the physical SIM card.

Step 404: Receive maintenance data that has a fixed format and that is sent by a maintenance server to the physical SIM card, where the maintenance data includes an identifier field, and the identifier field is used to identify that the maintenance data is maintenance data of the virtual SIM card.

Step 405: Maintain the virtual SIM card according to the maintenance data.

To sum up, according to the method for maintaining a virtual SIM card provided in this embodiment, a mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Figure 5A:
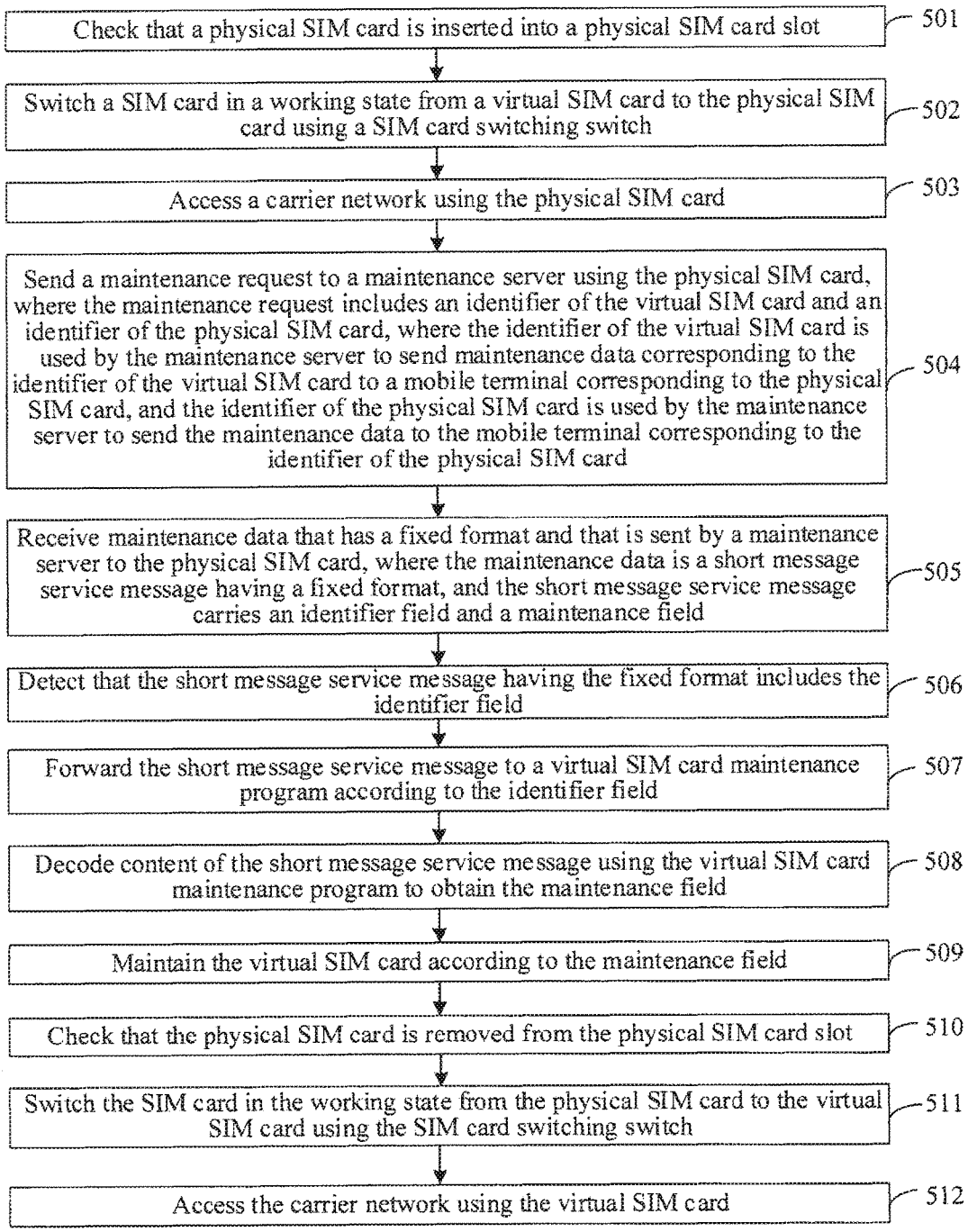
FIG. 5A is a method flowchart of a method for maintaining a virtual SIM card according to another embodiment of the present disclosure.

Referring to FIG. 5A, FIG. 5A is a method flowchart of a method for maintaining a virtual SIM card according to another embodiment of the present disclosure. The method is applied to the mobile terminal shown in FIG. 1, and includes the following steps.

Step 501: Check that a physical SIM card is inserted into a physical SIM card slot.

The virtual SIM card is a solution in which a SIM function is implemented using software. After the virtual SIM card installed in the mobile terminal is damaged, a carrier network cannot identify the damaged virtual SIM card, and as a result, the mobile terminal cannot access a network using the virtual SIM card.

To enable the mobile terminal to still access the network after the virtual SIM card is damaged, a network service is obtained using the physical SIM card in this embodiment of the present disclosure. The physical SIM card may be connected to the mobile terminal using a built-in SIM card slot of the mobile terminal, or an external SIM card slot of the mobile terminal.

In a possible implementation manner, after detecting that the virtual SIM card is damaged, the mobile terminal checks, every preset time period, whether the physical SIM card is inserted into the physical SIM card slot.

In another possible implementation manner, when supporting hot-pluggable detection of the external physical SIM card, the mobile terminal may check in real time whether the physical SIM card is inserted into the physical SIM card slot, and the implementation manner may be as follows.

After the physical SIM card is inserted into the physical SIM card slot, a corresponding pin of the SIM card circuit detects insertion of the physical SIM card. In this case, the SIM card circuit generates an interrupt signal, and transmits the interrupt signal to a processor. After detecting the interrupt signal, the processor determines that the physical SIM card is inserted into the physical SIM card slot.

It should be noted that, the foregoing two implementation manners are merely for description purposes, and a check manner in which the mobile terminal checks whether a physical SIM card is inserted into the physical SIM card slot after the mobile terminal detects that a virtual SIM card is damaged is not limited in this embodiment of the present disclosure.

Step 502: Switch a SIM card in a working state from the virtual SIM card to the physical SIM card using a SIM card switching switch.

After checking that the physical SIM card is inserted into the physical SIM card slot, the processor may send a switching instruction used to switch the SIM card switching switch included in the SIM card circuit to the SIM card circuit. After receiving the switching instruction, the SIM card circuit switches the virtual SIM card in the working state to the physical SIM card by switching the SIM card switching switch.

Figure 5B:
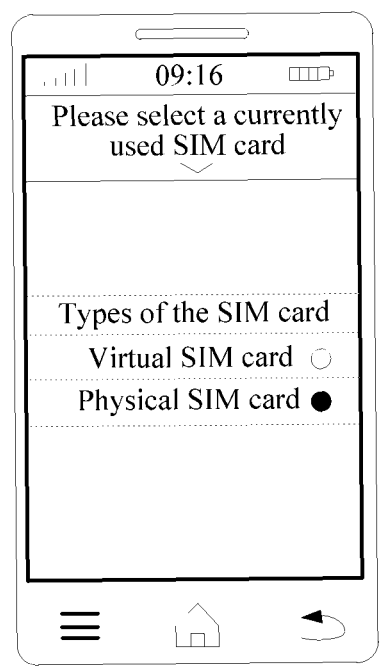
FIG. 5B is a schematic interface diagram of a selection interface of a SIM card according to an embodiment of the present disclosure.

It should be noted that, after checking that the physical SIM card is inserted into the physical SIM card slot, the mobile terminal may provide options of the virtual SIM card and the physical SIM card on a display interface of the mobile terminal, a user may switch a SIM card currently used by the mobile terminal from the virtual SIM card to the physical SIM card using the options provided by the mobile terminal, and a SIM card selection interface may be shown in FIG. 5B.

Step 503: Access a carrier network using the physical SIM card.

The communications chip obtains a network service using the newly inserted physical SIM card, and accesses a network provided by a carrier.

Step 504: Send a maintenance request to a maintenance server using the physical SIM card, where the maintenance request includes an identifier of the virtual SIM card and an identifier of the physical SIM card, where the identifier of the virtual SIM card is used by the maintenance server to send maintenance data corresponding to the identifier of the virtual SIM card to the mobile terminal corresponding to the physical SIM card, and the identifier of the physical SIM card is used by the maintenance server to send the maintenance data to the mobile terminal corresponding to the identifier of the physical SIM card.

After the mobile terminal using the physical SIM card accesses the network using the communications chip, the user may use the mobile terminal to log in to a maintenance website provided by the carrier, and sends the maintenance request of the virtual SIM card to the maintenance server using the maintenance website.

A database of the maintenance server stores maintenance data of each virtual SIM card, and the maintenance data may be prestored backup data of each virtual SIM card. After receiving the maintenance request sent by the mobile terminal using the physical SIM card, the maintenance server needs to obtain the maintenance data corresponding to the virtual SIM card from the database.

Because data of different virtual SIM cards is different, maintenance data needed by the different virtual SIM cards is also different, and the maintenance server needs to distinguish the different virtual SIM cards according to an identifier of the damaged virtual SIM card in order to obtain the maintenance data needed by the mobile terminal. Therefore, to make the maintenance server determine the maintenance data needed by the mobile terminal, the maintenance request sent by the mobile terminal needs to carry the identifier of the damaged virtual SIM card. The identifier may be a card number of the virtual SIM card, or may be an integrated circuit card identifier (ICCID) of the virtual SIM card.

In addition, after determining the maintenance data corresponding to the damaged virtual SIM card, the maintenance server further needs to determine the mobile terminal to which the maintenance data needs to be sent. To make the maintenance server correctly send the maintenance data to the mobile terminal sending the maintenance request, the maintenance request sent by the communications chip further needs to carry the identifier of the currently used physical SIM card. The identifier may be a card number of the physical SIM card, or may be an ICCID of the physical SIM card.

It should be noted that, to ensure security of virtual SIM cards of general virtual SIM card users, before sending the maintenance request to the maintenance server, the user further needs to obtain a right of sending a maintenance request to a maintenance server granted by the carrier.

It should be further noted that, in an alternative implementation manner of this step, the user may also enter, using a computer, a maintenance website provided by the carrier, and send the maintenance request including the identifier of the virtual SIM and the identifier of the physical SIM card to the maintenance server.

In the other approaches, after the communications chip sends the maintenance request to the maintenance server using the physical SIM card, the maintenance server generates maintenance data according to the identifier of the physical SIM card, and sends the maintenance data to the mobile terminal, and the mobile terminal sends, according to an identifier field that is included in the maintenance data and that is used to identify that the maintenance data is the maintenance data of the physical SIM card, the maintenance data to a physical SIM card maintenance program for processing corresponding to the physical SIM card.

In the other approaches, after the communications chip sends the maintenance request to the maintenance server using the virtual SIM card, the maintenance server generates maintenance data according to the identifier of the virtual SIM card, and sends the maintenance data to the mobile terminal, and the mobile terminal sends, according to an identifier field that is included in the maintenance data and that is used to identify that the maintenance data is the maintenance data of the virtual SIM card, the maintenance data to a virtual SIM card maintenance program for processing corresponding to the virtual SIM card.

That is, in the other approaches, if the physical SIM card and the virtual SIM card are both installed in the mobile terminal, after the mobile terminal sends the maintenance request to the maintenance server using one of the SIM cards, the mobile terminal sends the received maintenance data to a maintenance program for processing of the SIM card, but does not send the maintenance data to a maintenance program for processing of the other SIM card.

However, in this embodiment of the present disclosure, after the mobile terminal sends the maintenance request using the physical SIM card, because the maintenance request carries both the identifier of the physical SIM card and the identifier of the virtual SIM card, the maintenance server generates the maintenance data according to the identifier of the virtual SIM card, also sets the identifier field in the generated maintenance data to an identifier field used to identify that the maintenance data is the maintenance data of the virtual SIM card, and then sends the maintenance data to the mobile terminal corresponding to the identifier of the physical SIM card such that after detecting the identifier field, in the maintenance data, used to identify that the maintenance data is the maintenance data of the virtual SIM card, the mobile terminal may not send the maintenance data to the physical SIM card maintenance program for processing corresponding to the physical SIM card, but sends the maintenance data to the virtual SIM card maintenance program for processing corresponding to the virtual SIM card.

For example, after the mobile terminal sends the maintenance request to the maintenance server using the physical SIM card, the maintenance server generates a short message service message (SMS PP-Download) according to the identifier of the virtual SIM card carried in the maintenance request, and also sets a toolkit application reference (TAR) value in the SMS PP-Download to a virtual SIM card maintenance dedicated value used to identify that the maintenance data is the maintenance data of the virtual SIM card, and then sends the SMS PP-Download to the mobile terminal corresponding to the identifier of the physical SIM card that is carried in the maintenance request. After receiving the SMS PP-Download, the mobile terminal sends, according to the virtual SIM card maintenance dedicated value, the SMS PP-Download to the virtual SIM card maintenance program for processing corresponding to the virtual SIM card.

Step 505: Receive maintenance data that has a fixed format and that is sent by a maintenance server to the physical SIM card, where the maintenance data is a short message service message having a fixed format, and the short message service message carries an identifier field and a maintenance field.

The mobile terminal receives, using the communications chip, the maintenance data that has a fixed format and that is sent by the maintenance server.

Step 506: Detect that the short message service message having the fixed format includes the identifier field.

After the mobile terminal receives the short message service message having the fixed format, the processor may determine, according to the fixed format, that the short message service message is the maintenance data used to maintain the SIM card. When determining that the short message service message is the maintenance data used to maintain the SIM card, the processor continues to detect whether the identifier field used to identify that the short message service message is used to maintain the virtual SIM card is included in the short message service message, and if the processor detects that the identifier field is included in the short message service message, the processor determines to send the maintenance data to the virtual SIM card maintenance program corresponding to the virtual SIM card.

Step 507: Forward the short message service message to a virtual SIM card maintenance program according to the identifier field.

If the processor detects that the identifier field used to identify that the short message service message is used to maintain the virtual SIM card is included in the short message service message, the processor sends the short message service message to the virtual SIM card maintenance program corresponding to the virtual SIM card.

It should be noted that, the virtual SIM card maintenance program needs to be activated and initialized before obtaining the short message service message. Generally, when the mobile terminal is in a power-on state, the virtual SIM card maintenance program already completes activation and initialization.

Step 508: Decode content of the short message service message using the virtual SIM card maintenance program to obtain the maintenance field.

Step 509: Maintain the virtual SIM card according to the maintenance field.

After decoding the content of the short message service message using the virtual SIM card maintenance program to obtain the maintenance field, the processor may maintain the virtual SIM card according to the maintenance field.

The processor may maintain the virtual SIM card using the following methods.

(1) According to the maintenance field, damaged data in the virtual SIM card is recovered according to a format provided by the carrier.

When the method (1) is used to maintain the virtual SIM card, the processor needs to recover lost or incorrect data in the virtual SIM card in order to complete maintenance of the virtual SIM card.

(2) According to the maintenance field, the data of the virtual SIM card is rewritten according to a format provided by the carrier.

When the method (2) is used to maintain the virtual SIM card, the processor may write backup data of the virtual SIM card carried in the maintenance data to the virtual SIM card, that is, complete data of the virtual SIM card is used to cover or replace the damaged data of the virtual SIM card.

It should be noted that, after maintenance work of the virtual SIM card is completed, the mobile terminal may further send feedback information carrying a maintenance result of the virtual SIM card to the maintenance server using the network. After receiving the feedback information sent by the mobile terminal, the maintenance server may correspondingly record the maintenance result of the virtual SIM card and the card number of the virtual SIM card in the maintenance website according to the feedback information.

Figure 5C:
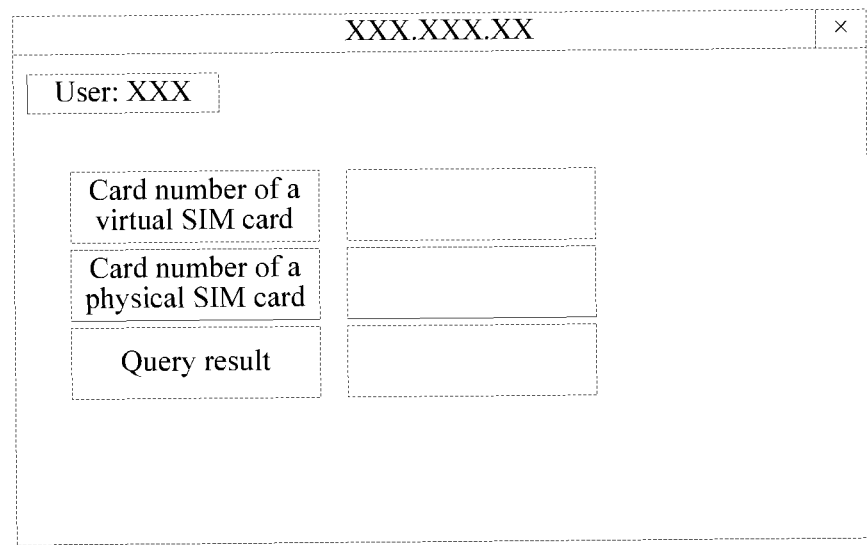
FIG. 5C is a schematic diagram of a query interface of a maintenance result of a virtual SIM card according to an embodiment of the present disclosure.

The user may query for information about the maintenance result of the virtual SIM card using the maintenance website. For example, the user may input the card number of the maintained virtual SIM card in a card number input field of the virtual SIM card provided by the maintenance website in order to obtain the maintenance result of the virtual SIM card, and the query interface may be shown in FIG. 5C.

Step 510: Check that the physical SIM card is removed from the physical SIM card slot.

After the maintenance result of the virtual SIM card obtained by the user using the maintenance website is success, the physical SIM card generally needs to be removed, but after the obtained maintenance result of the virtual SIM card is failure, the physical SIM card generally needs to be continuously used to perform step 504 to step 509 to maintain the virtual SIM again, and therefore, after maintaining the virtual SIM card, the mobile terminal may check whether the physical SIM card is removed from the physical SIM card slot.

In a possible implementation manner, the mobile terminal checks, every preset time period, whether the physical SIM card is removed from the physical SIM card slot.

In another possible implementation manner, when supporting hot-pluggable detection of the external physical SIM card, the mobile terminal may check in real time whether the physical SIM card is removed from the physical SIM card slot, and in this case, the implementation manner may be as follows After the physical SIM card is removed from the physical SIM card slot, a corresponding pin of the SIM card circuit detects that the physical SIM card is removed. In this case, the SIM card circuit generates an interrupt signal, and transmits the interrupt signal to the processor. After detecting the interrupt signal, the processor determines that the physical SIM card is removed from the physical SIM card slot.

Step 511: Switch the SIM card in the working state from the physical SIM card to the virtual SIM card using the SIM card switching switch.

After checking that the physical SIM card is removed from the physical SIM card slot, the processor may send a switching instruction used to switch the SIM card switching switch included in the SIM card circuit to the SIM card circuit. After receiving the switching instruction, the SIM card circuit switches the SIM card in the working state to the maintained virtual SIM card by switching the SIM card switching switch, and uses the virtual SIM card to search for the network, to obtain a network service provided by the carrier.

It should be noted that, the user may also manually select the virtual SIM card as the currently used SIM card using the options provided by the mobile terminal.

Step 512: Access the carrier network using the virtual SIM card.

For ease of description, a scenario in which the user uses the method embodiment is used to describe beneficial effects brought about by this embodiment of the present disclosure After data of a virtual SIM card of a user Xiaowang is damaged, Xiaowang cannot access a carrier network using the virtual SIM card.

If it is in the past, Xiaowang can only contact a manufacturer for an after-sales service, and returns the whole mobile terminal to the manufacturer for repair, and during repair, Xiaowang cannot use the mobile terminal, and may need to pay for delivery and repair expenses of the mobile terminal.

However, by means of the method for maintaining a virtual SIM card provided in this embodiment of the present disclosure, Xiaowang may insert an USIM card into an external slot of the mobile terminal, accesses the carrier network using the USIM card, enters the maintenance website provided by the carrier, and then adds a card number of a damaged virtual SIM card of Xiaowang and a card number of the USIM card to a maintenance request and sends the maintenance request to the maintenance server using an identity that is granted by the carrier. Several seconds later, after the mobile terminal of Xiaowang receives maintenance data sent by the maintenance server, the virtual SIM card in the mobile terminal is maintained. Xiaowang may input the card number of the virtual SIM card of Xiaowang in the maintenance website to obtain a current maintenance result, and when the obtained maintenance result is success, Xiaowang may remove the external USIM card, and continues to access the carrier network for normal communication using the virtual SIM card.

Xiaowang only needs to spend little time finishing a series of foregoing actions at home. This can not only save maintenance expenses of a virtual SIM card, but also avoid a series of problems caused by an after-sales service.

It should be noted that, the method for maintaining a virtual SIM card provided in this embodiment of the present disclosure may be further applied to a SIM card in another form, that is, a type of a SIM card is not limited in this embodiment of the present disclosure. The method may be applied to a SIM card in any form, to maintain a SIM card in another form, for example, between different types of physical SIM cards, or between different types of virtual SIM cards, or assist in maintenance of a physical SIM card using a virtual SIM card, or the like.

To sum up, according to the method for maintaining a virtual SIM card provided in this embodiment, a mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Figure 6:
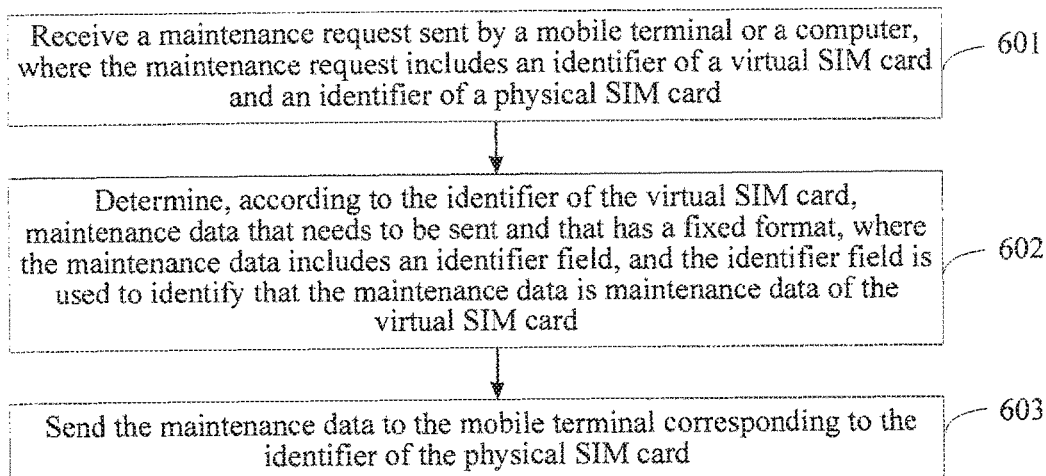
FIG. 6 is a method flowchart of a method for maintaining a virtual SIM card according to still another embodiment of the present disclosure.

Referring to FIG. 6, FIG. 6 is a method flowchart of a method for maintaining a virtual SIM card according to still another embodiment of the present disclosure. The method is applied to the mobile terminal shown in FIG. 1, and includes the following steps.

Step 601: Receive a maintenance request sent by the mobile terminal or a computer, where the maintenance request includes an identifier of a virtual SIM card and an identifier of a physical SIM card.

Step 602: Determine, according to the identifier of the virtual SIM card, maintenance data that needs to be sent and that has a fixed format, where the maintenance data includes an identifier field, and the identifier field is used to identify that the maintenance data is maintenance data of the virtual SIM card.

Step 603: Send the maintenance data to the mobile terminal corresponding to the identifier of the physical SIM card.

To sum up, according to the method for maintaining a virtual SIM card provided in this embodiment, a maintenance request sent by a mobile terminal or a computer is received, and maintenance data is sent to a physical SIM card of the mobile terminal, and the mobile terminal may maintain a virtual SIM card according to the maintenance data such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Figure 7:
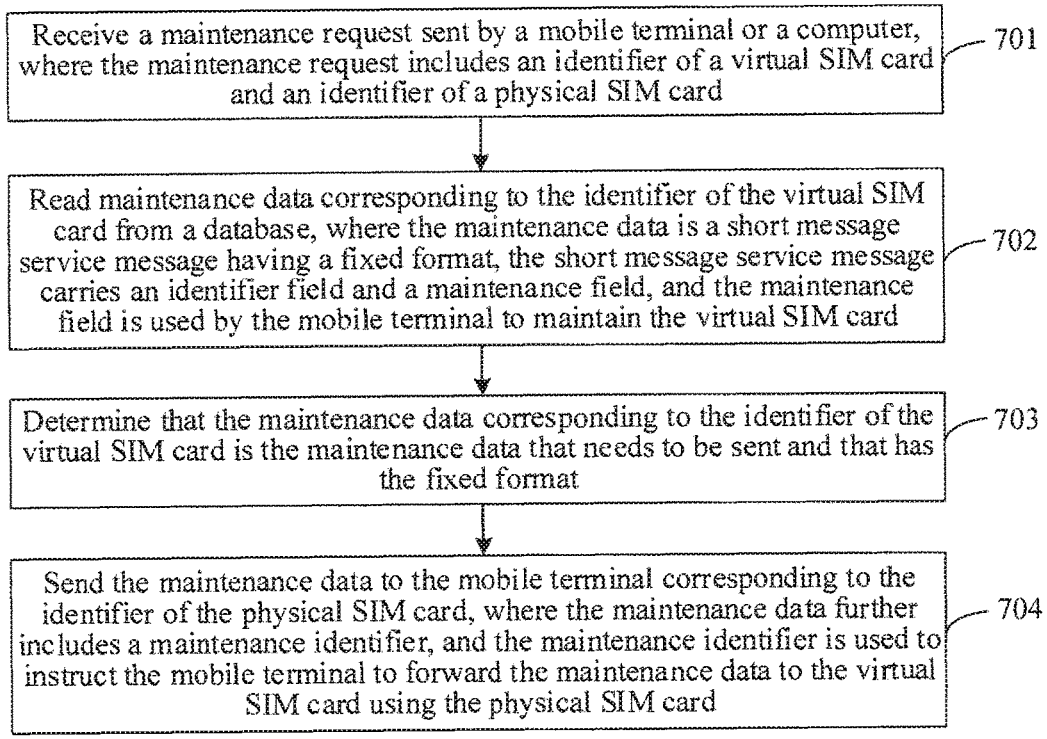
FIG. 7 is a method flowchart of a method for maintaining a virtual SIM card according to yet another embodiment of the present disclosure.

Referring to FIG. 7, FIG. 7 is a method flowchart of a method for maintaining a virtual SIM card according to yet another embodiment of the present disclosure. The method is applied to the maintenance server shown in FIG. 1, and includes the following steps.

Step 701: Receive a maintenance request sent by a mobile terminal or a computer, where the maintenance request includes an identifier of a virtual SIM card and an identifier of a physical SIM card.

When a virtual SIM card in the mobile terminal used by a user is damaged, the user may switch a SIM card currently used by the mobile terminal from the virtual SIM card to the physical SIM card such that the mobile terminal may normally send or receive data.

After the mobile terminal using the physical SIM card accesses, using a communications chip, a network provided by a carrier, the user may log in to a maintenance website provided by the carrier and send a maintenance request of maintaining the damaged virtual SIM card to the maintenance server.

It should be noted that, to ensure security of the virtual SIM card of the virtual SIM card user, the maintenance website first needs to determine whether an account used by the user to log in to the maintenance website has a right of sending the maintenance request, and if the maintenance website determines that the account has the right of sending the maintenance request, the maintenance website receives, using a communications board, the maintenance request sent by the account, and sends the maintenance request to the maintenance server.

In addition, a database of the maintenance server stores maintenance data of virtual SIM cards, the maintenance data of the virtual SIM cards is different, and the maintenance server can determine, only according to identifiers of the virtual SIM cards, maintenance data of a virtual SIM card needed by the mobile terminal from the database. Therefore, the maintenance request sent by the mobile terminal needs to carry an identifier of the damaged virtual SIM card, and the identifier may be an ICCID of the damaged virtual SIM card.

To accurately send the determined maintenance data to the mobile terminal initiating the maintenance request, the maintenance server further needs to obtain the identifier of the physical SIM card currently used by the mobile terminal such that the maintenance request sent by the mobile terminal further needs to carry the identifier of the currently used physical SIM card, and the identifier may be an ICCID of the physical SIM card.

It should be further noted that, the user may further log in to the maintenance website using the computer, and sends, using the maintenance website, the maintenance request for maintaining the damaged virtual SIM card to the maintenance server. The maintenance request carries the identifier of the damaged virtual SIM card and the identifier of the physical SIM card currently used by the mobile terminal.

Correspondingly, the maintenance server obtains the maintenance request sent by the mobile terminal.

Step 702: Read maintenance data corresponding to the identifier of the virtual SIM card from a database, where the maintenance data is a short message service message having a fixed format, the short message service message carries an identifier field and a maintenance field, and the maintenance field is used by the mobile terminal to maintain the virtual SIM card.

After obtaining the identifier of the virtual SIM card from the maintenance request, a processor may read the maintenance data corresponding to the identifier of the virtual SIM card from the database according to the identifier of the virtual SIM card.

Step 703: Determine that the maintenance data corresponding to the identifier of the virtual SIM card is the maintenance data that needs to be sent and that has the fixed format.

After obtaining the maintenance data corresponding to the identifier of the virtual SIM card from the database, the processor determines that the maintenance data is the maintenance data that needs to be sent to the mobile terminal and that has the fixed format.

The maintenance data is used to maintain data of the virtual SIM card corresponding to the identifier of the virtual SIM card, and the maintenance data may be backup data of the virtual SIM cards prestored in the maintenance server.

For example, if the identifier of the virtual SIM card is an ICCID "89860000000000000000", after obtaining maintenance information of the virtual SIM card whose ICCID is "89860000000000000000" from the database, the maintenance server determines that the maintenance information of the virtual SIM card whose ICCID is "89860000000000000000" is the maintenance data that needs to be sent to the mobile terminal.

Step 704: Send the maintenance data to the mobile terminal corresponding to the identifier of the physical SIM card, where the maintenance data further includes a maintenance identifier, and the maintenance identifier is used to instruct the mobile terminal to forward the maintenance data to the virtual SIM card using the physical SIM card.

After determining the maintenance data that needs to be sent, the processor of the maintenance server adds the maintenance identifier to the maintenance data carrying the virtual SIM card, and then sends, according to the identifier of the physical SIM card carried in the maintenance request, the maintenance data to the physical SIM card corresponding to the identifier of the physical SIM card using the communications board.

For example, if the identifier of the physical SIM card is an ICCID "89860000000000000001", after adding the maintenance identifier to the determined maintenance data, the maintenance server sends the maintenance data to the physical SIM card whose ICCID is "89860000000000000001" using the communications board.

The maintenance identifier is used to instruct the mobile terminal to forward the maintenance data to the virtual SIM card using the physical SIM card.

It should be noted that, after sending the maintenance data, the maintenance server may further receive, using the communications board, feedback information that is sent by the mobile terminal and that carries a maintenance result of the virtual SIM card, and correspondingly record the maintenance result of the virtual SIM card and the ICCID of the virtual SIM card in the maintenance website according to the feedback information such that the user may query for a result of current maintenance using the maintenance website.

To sum up, according to the method for maintaining a virtual SIM card provided in this embodiment, a maintenance request sent by a mobile terminal or a computer is received, and maintenance data is sent to a physical SIM card of the mobile terminal, and the mobile terminal may maintain a virtual SIM card according to the maintenance data such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Figure 8:
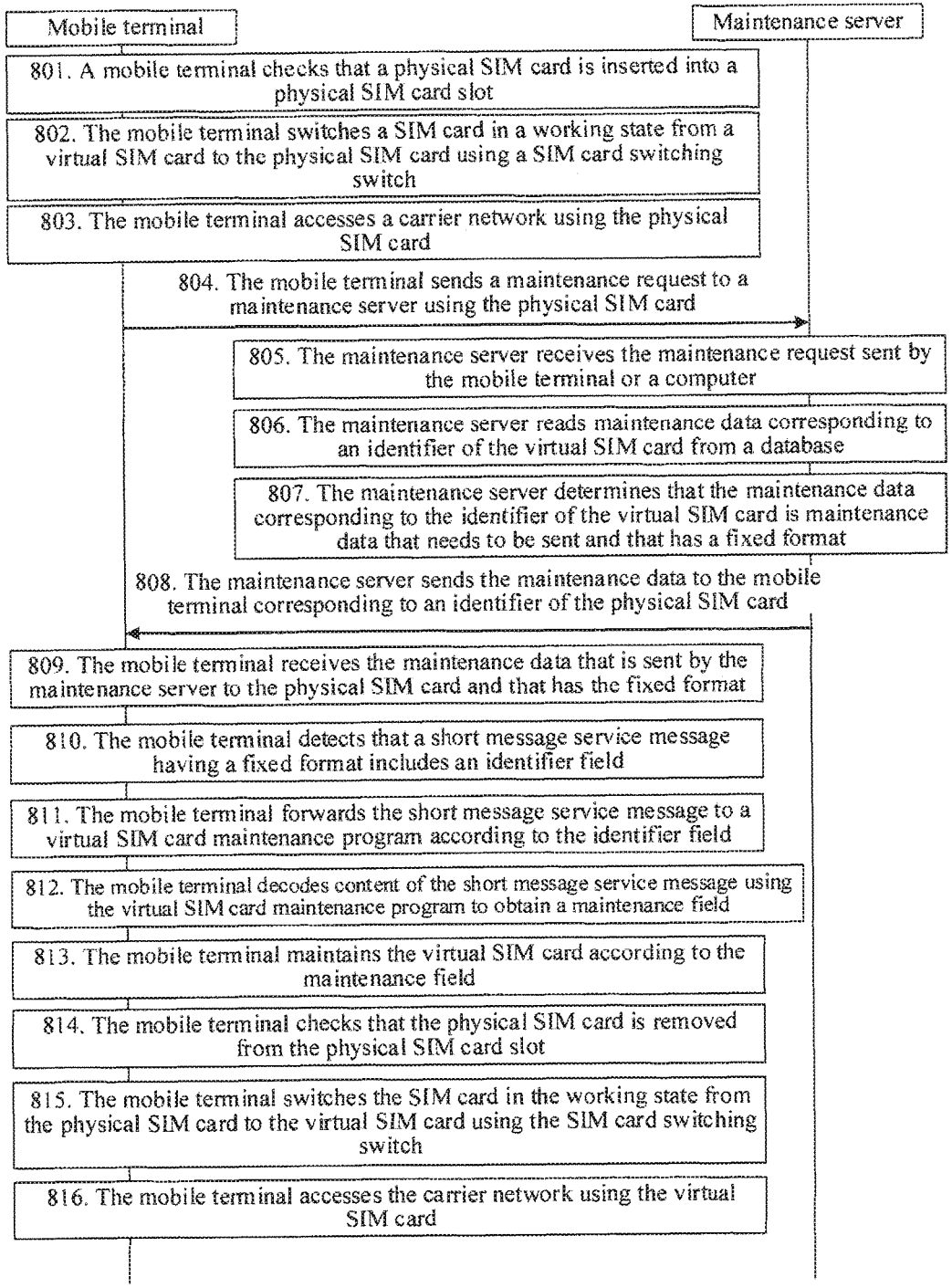
FIG. 8 is a method flowchart of a method for maintaining a virtual SIM card according to yet another embodiment of the present disclosure.

Referring to FIG. 8, FIG. 8 is a method flowchart of a method for maintaining a virtual SIM card according to yet another embodiment of the present disclosure. The method is applied to the mobile terminal and the maintenance server shown in FIG. 1, and includes the following steps.

Step 801: The mobile terminal checks that a physical SIM card is inserted into a physical SIM card slot.

Step 802: The mobile terminal switches a SIM card in a working state from a virtual SIM card to the physical SIM card using a SIM card switching switch.

Step 803: The mobile terminal accesses a carrier network using the physical SIM card.

After reading information about the physical SIM card, the mobile terminal may disconnect from the damaged virtual SIM card, obtain a network service using the newly inserted physical SIM card and access a network provided by a carrier.

Step 804: The mobile terminal sends a maintenance request to the maintenance server using the physical SIM card.

An identifier of the virtual SIM card is used by the maintenance server to determine maintenance data that needs to be sent, and an identifier of the physical SIM card is used by the maintenance server to send the maintenance data to the mobile terminal.

After the mobile terminal accesses the network using the physical SIM card, a user may enter, using the mobile terminal, a maintenance website provided by the carrier, and send the maintenance request of the virtual SIM card to the maintenance server.

Step 805: The maintenance server receives the maintenance request sent by the mobile terminal or a computer.

Step 806: The maintenance server reads maintenance data corresponding to an identifier of the virtual SIM card from a database.

Step 807: The maintenance server determines that the maintenance data corresponding to the identifier of the virtual SIM card is maintenance data that needs to be sent and that has a fixed format.

Step 808: The maintenance server sends the maintenance data to the mobile terminal corresponding to an identifier of the physical SIM card.

Step 809: The mobile terminal receives the maintenance data that is sent by the maintenance server to the physical SIM card and that has the fixed format.

Step 810: The mobile terminal detects that a short message service message having a fixed format includes an identifier field.

Step 811: The mobile terminal forwards the short message service message to a virtual SIM card maintenance program according to the identifier field.

Step 812: The mobile terminal decodes content of the short message service message using the virtual SIM card maintenance program to obtain a maintenance field.

Step 813: The mobile terminal maintains the virtual SIM card according to the maintenance field.

Step 814: The mobile terminal checks that the physical SIM card is removed from the physical SIM card slot.

Step 815: The mobile terminal switches the SIM card in the working state from the physical SIM card to the virtual SIM card using the SIM card switching switch.

Step 816: The mobile terminal accesses the carrier network using the virtual SIM card.

To sum up, according to the method for maintaining a virtual SIM card provided in this embodiment, a mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Figure 9:
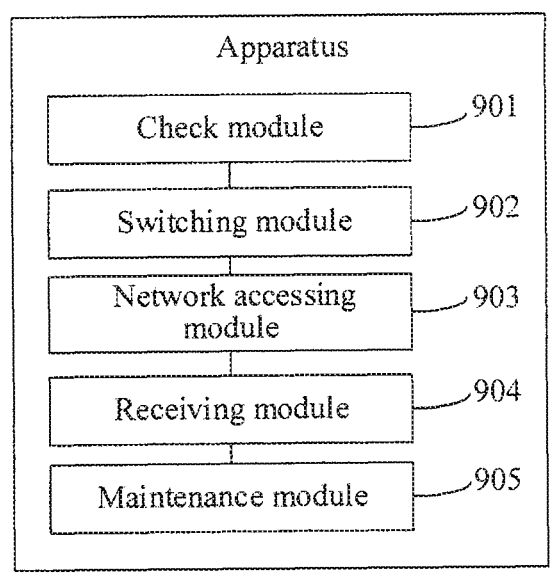
FIG. 9 is a schematic structural diagram of an apparatus for maintaining a virtual SIM card according to an embodiment of the present disclosure.

Referring to FIG. 9, FIG. 9 is a schematic structural diagram of an apparatus for maintaining a virtual SIM card according to an embodiment of the present disclosure. The apparatus for maintaining a virtual SIM card may be implemented, using software, hardware or a combination of software and hardware, as all or a part of the mobile terminal shown in FIG. 1, and includes a check module 901, a switching module 902, a network accessing module 903, a receiving module 904, and a maintenance module 905.

The check module 901 is configured to check that a physical SIM card is inserted into a physical SIM card slot.

The switching module 902 is configured to switch a SIM card in a working state from the virtual SIM card to the physical SIM card using a SIM card switching switch.

The network accessing module 903 is configured to access a carrier network using the physical SIM card.

The receiving module 904 is configured to receive maintenance data that has a fixed format and that is sent by a maintenance server to the physical SIM card. The maintenance data includes an identifier field, and the identifier field is used to identify that the maintenance data is maintenance data of the virtual SIM card The maintenance module 905 is configured to maintain the virtual SIM card according to the maintenance data.

To sum up, according to the apparatus for maintaining a virtual SIM card provided in this embodiment, the mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Figure 10:
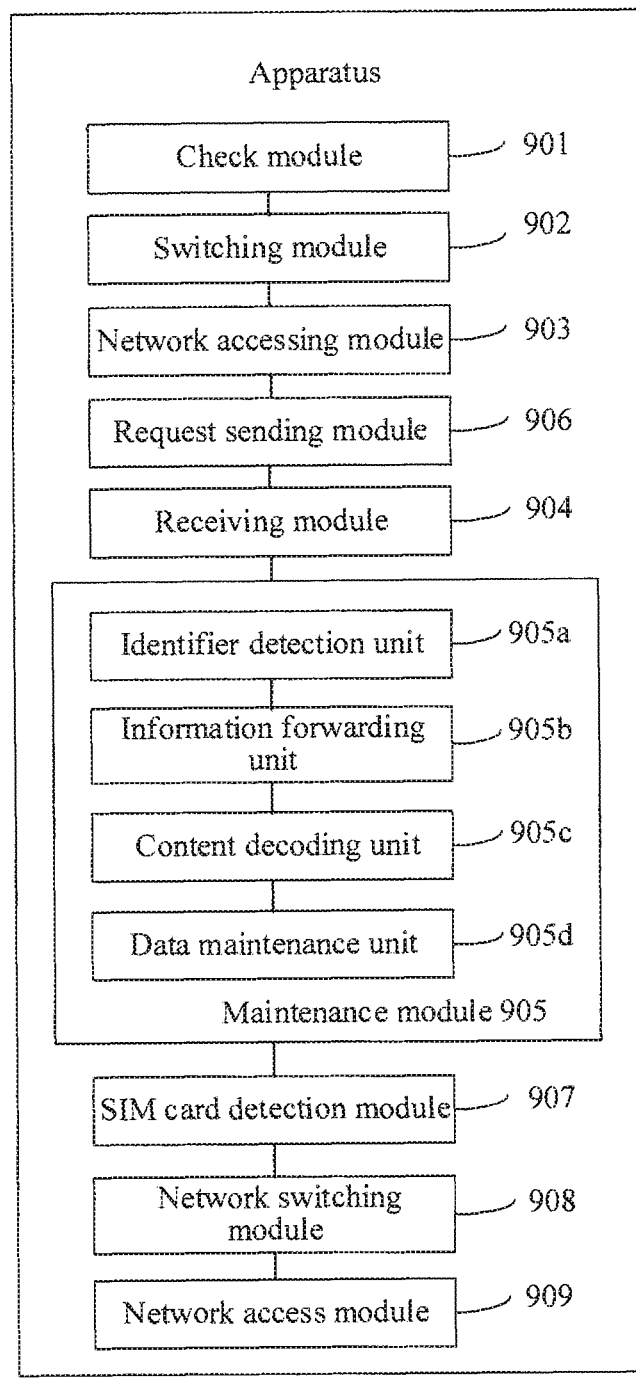
FIG. 10 is a schematic structural diagram of an apparatus for maintaining a virtual SIM card according to another embodiment of the present disclosure.

Referring to FIG. 10, FIG. 10 is a schematic structural diagram of an apparatus for maintaining a virtual SIM card according to an embodiment of the present disclosure. The apparatus for maintaining a virtual SIM card may be implemented, using software, hardware or a combination of software and hardware, as all or a part of the mobile terminal shown in FIG. 1, and includes a check module 901, a switching module 902, a network accessing module 903, a receiving module 904, and a maintenance module 905.

The check module 901 is configured to check that a physical SIM card is inserted into a physical SIM card slot.

The switching module 902 is configured to switch a SIM card in a working state from the virtual SIM card to the physical SIM card using a SIM card switching switch.

The network accessing module 903 is configured to access a carrier network using the physical SIM card.

The receiving module 904 is configured to receive maintenance data that has a fixed format and that is sent by a maintenance server to the physical SIM card. The maintenance data includes an identifier field, and the identifier field is used to identify that the maintenance data is maintenance data of the virtual SIM card.

The maintenance module 905 is configured to maintain the virtual SIM card according to the maintenance data.

Optionally, the maintenance data is a short message service message having a fixed format. The short message service message carries the identifier field and a maintenance field.

The maintenance module 905 includes an identifier detection unit 905a, an information forwarding unit 905b, a content decoding unit 905c, and a data maintenance unit 905d.

The identifier detection unit 905a is configured to detect that the short message service message having the fixed format includes the identifier field.

The information forwarding unit 905b is configured to forward the short message service message to a virtual SIM card maintenance program according to the identifier field.

The content decoding unit 905c is configured to decode content of the short message service message using the virtual SIM card maintenance program to obtain the maintenance field.

The data maintenance unit 905d is configured to maintain the virtual SIM card according to the maintenance field.

Optionally, the apparatus further includes a request sending module 906.

The request sending module 906 is configured to send a maintenance request to the maintenance server using the physical SIM card. The maintenance request includes an identifier of the virtual SIM card and an identifier of the physical SIM card.

The identifier of the virtual SIM card is used by the maintenance server to send maintenance data corresponding to the identifier of the virtual SIM card to the mobile terminal corresponding to the physical SIM card.

The identifier of the physical SIM card is used by the maintenance server to send the maintenance data to the mobile terminal corresponding to the identifier of the physical SIM card.

Optionally, the apparatus further includes a SIM card detection module 907, a network switching module 908, and a network access module 909.

The SIM card detection module 907 is configured to check that the physical SIM card is removed from the physical SIM card slot.

The network switching module 908 is configured to switch the SIM card in the working state from the physical SIM card to the virtual SIM card using the SIM card switching switch.

The network access module 909 is configured to access the carrier network using the virtual SIM card.

To sum up, according to the apparatus for maintaining a virtual SIM card provided in this embodiment, the mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Figure 11:
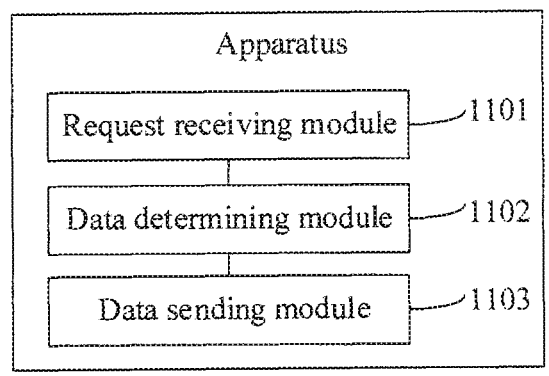
FIG. 11 is a schematic structural diagram of an apparatus for maintaining a virtual SIM card according to still another embodiment of the present disclosure.

Referring to FIG. 11, FIG. 11 is a schematic structural diagram of an apparatus for maintaining a virtual SIM card according to still another embodiment of the present disclosure. The apparatus for maintaining a virtual SIM card may be implemented, using software, hardware or a combination of software and hardware, as all or a part of the maintenance server shown in FIG. 1, and includes a request receiving module 1101, a data determining module 1102, and a data sending module 1103.

The request receiving module 1101 is configured to receive a maintenance request sent by a mobile terminal or a computer. The maintenance request includes an identifier of a virtual SIM card and an identifier of a physical SIM card.

The data determining module 1102 is configured to determine, according to the identifier of the virtual SIM card, maintenance data that needs to be sent and that has a fixed format. The maintenance data includes an identifier field, and the identifier field is used to identify that the maintenance data is maintenance data of the virtual SIM card.

The data sending module 1103 is configured to send the maintenance data to the mobile terminal corresponding to the identifier of the physical SIM card.

To sum up, according to the apparatus for maintaining a virtual SIM card provided in this embodiment, the mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

Figure 12:
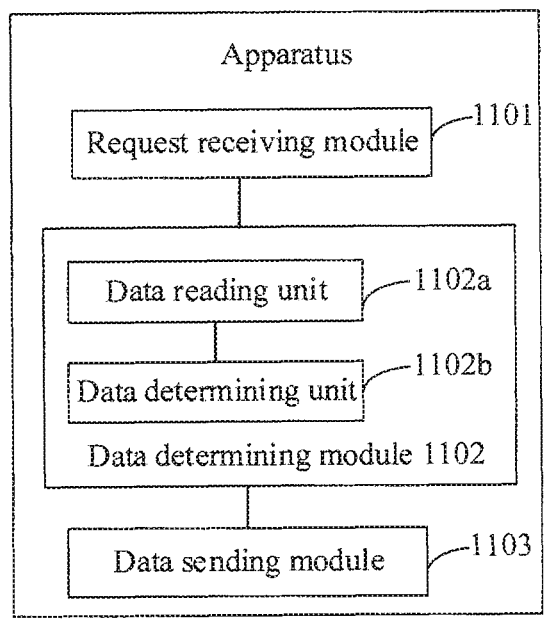
FIG. 12 is a schematic structural diagram of an apparatus for maintaining a virtual SIM card according to yet another embodiment of the present disclosure.

Referring to FIG. 12, FIG. 12 is a schematic structural diagram of an apparatus for maintaining a virtual SIM card according to yet another embodiment of the present disclosure. The apparatus for maintaining a virtual SIM card may be implemented, using software, hardware or a combination of software and hardware, as all or a part of the maintenance server shown in FIG. 1, and includes a request receiving module 1101, a data determining module 1102, and a data sending module 1103.

The request receiving module 1101 is configured to receive a maintenance request sent by a mobile terminal or a computer. The maintenance request includes an identifier of a virtual SIM card and an identifier of a physical SIM card.

The data determining module 1102 is configured to determine, according to the identifier of the virtual SIM card, maintenance data that needs to be sent and that has a fixed format. The maintenance data includes an identifier field, and the identifier field is used to identify that the maintenance data is maintenance data of the virtual SIM card.

The data sending module 1103 is configured to send the maintenance data to the mobile terminal corresponding to the identifier of the physical SIM card.

Optionally, the data determining module 1102 includes a data reading unit 1102a, and a data determining unit 1102b.

The data reading unit 1102a is configured to read maintenance data corresponding to the identifier of the virtual SIM card from a database. The maintenance data is a short message service message having a fixed format, the short message service message carries the identifier field and a maintenance field, and the maintenance field is used by the mobile terminal to maintain the virtual SIM card.

The data determining unit 1102b is configured to determine that the maintenance data corresponding to the identifier of the virtual SIM card is the maintenance data that needs to be sent and that has the fixed format.

To sum up, according to the apparatus for maintaining a virtual SIM card provided in this embodiment, the mobile terminal accesses a network using a physical SIM card such that the mobile terminal may receive maintenance data sent by a maintenance server, and maintain a virtual SIM card according to the maintenance data. The physical SIM card is configured to assist in maintaining the virtual SIM card such that the virtual SIM card can still be maintained without returning the mobile terminal to a manufacturer for maintenance after data of the virtual SIM card in the mobile terminal is damaged. This resolves problems that when a virtual SIM card is damaged, maintenance costs are high, and a maintenance interval is long, and this reduces the maintenance costs of the virtual SIM card and shortens the maintenance interval.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A mobile terminal, supporting both a virtual subscriber identity module (SIM) card and a physical SIM card, comprising:
   a processor;
   a communications chip coupled to the processor; and
   a SIM card circuit coupled to the communications chip, the SIM card circuit comprising:
      a SIM card switching switch; and
      a physical SIM card slot, the SIM card circuit being configured to:
         detect whether the virtual SIM card is damaged;
         check that the physical SIM card is inserted into the physical SIM card slot; and
         switch a SIM card in a working state from the virtual SIM card to the physical SIM card using the SIM card switching switch when the virtual SIM card is damaged,
      the communications chip being configured to:
         access a carrier network using the physical SIM card;
         send a card number of the virtual SIM to a maintenance website provided by a carrier; and
         receive maintenance data that has a fixed format from a maintenance server to the physical SIM card by sending the card number of the virtual SIM to the maintenance website,
      the maintenance data comprising an identifier field, the identifier field identifying that the maintenance data is maintenance data of the virtual SIM card,
      the processor being configured to maintain the virtual SIM card according to the maintenance data, the maintenance data comprising a short message service message having a fixed format, the short message service message carrying the identifier field and a maintenance field, the processor being further configured to:
  detect that the short message service message having the fixed format comprises the identifier field;
  forward the short message service message to a virtual SIM maintenance program according to the identifier field;
  decode content of the short message service message using the virtual SIM card maintenance program to obtain the maintenance field; and
  maintain the virtual SIM card according to the maintenance field, and the communication chip being further configured to obtain a current maintenance result from the maintenance website provided by the carrier indicating whether maintenance to the virtual SIM card is a success.

2. The mobile terminal according to claim 1, wherein the communications chip is further configured to send a maintenance request to the maintenance server using the physical SIM card, the maintenance request comprising an identifier of the virtual SIM card and an identifier of the physical SIM card, the identifier of the virtual SIM card being used by the maintenance server to send the maintenance data corresponding to the identifier of the virtual SIM card to the mobile terminal corresponding to the physical SIM card, and the identifier of the physical SIM card being used by the maintenance server to send the maintenance data to the mobile terminal corresponding to the identifier of the physical SIM card.

3. The mobile terminal according to claim 1, wherein the SIM card circuit is further configured to:
  check that the physical SIM card is removed from the physical SIM card slot; and
  switch the SIM card in the working state from the physical SIM card to the virtual SIM card using the SIM card switching switch, the communications chip being further configured to access the carrier network using the virtual SIM card.

4. A method for maintaining a virtual subscriber identity module (SIM) card, in a mobile terminal supporting both the virtual SIM card and a physical SIM card, comprising:
  detecting whether the virtual SIM card is damaged;
  checking that the physical SIM card is inserted into a physical SIM card slot;
  switching a SIM card in a working state from the virtual SIM card to the physical SIM card using a SIM card switching switch when the virtual SIM card is damaged;
  accessing a carrier network using the physical SIM card;
  sending a card number of the virtual SIM to a maintenance website provided by a carrier;
  receiving maintenance data that has a fixed format from a maintenance server to the physical SIM card by sending the card number of the virtual SIM to the maintenance website, the maintenance data comprises an identifier field, and the identifier field identifying that the maintenance data is maintenance data of the virtual SIM card;
  maintaining the virtual SIM card according to the maintenance data, the maintenance data comprising a short message service message having a fixed format, the short message service message carrying the identifier field and a maintenance field;
  detecting that the short message service message having the fixed format comprises the identifier field;
  forwarding the short message service message to a virtual SIM maintenance program according to the identifier field;
  decoding content of the short message service message using the virtual SIM card maintenance program to obtain the maintenance field;
  maintaining the virtual SIM card according to the maintenance field; and
  obtaining a current maintenance result from the maintenance website provided by the carrier indicating whether maintenance of the virtual SIM card is a success.

5. The method according to claim 4, wherein before receiving the maintenance data, the method further comprises sending a maintenance request to the maintenance server using the physical SIM card, the maintenance request comprising an identifier of the virtual SIM card and an identifier of the physical SIM card, the identifier of the virtual SIM card being used by the maintenance server to send maintenance data corresponding to the identifier of the virtual SIM card to the mobile terminal corresponding to the physical SIM card, and the identifier of the physical SIM card being used by the maintenance server to send the maintenance data to the mobile terminal corresponding to the identifier of the physical SIM card.

6. The method according to claim 4, wherein after maintaining the virtual SIM card, the method further comprises:
  checking that the physical SIM card is removed from the physical SIM card slot;
  switching the SIM card in the working state from the physical SIM card to the virtual SIM card using the SIM card switching switch; and
  accessing the carrier network using the virtual SIM card.

7. A non-transitory computer readable storage medium storing executable instructions that cause a computer to perform a method comprising:
  detecting whether a virtual subscriber identity module (SIM) card is damaged;
  checking that a physical SIM card is inserted into a physical SIM card slot;
  switching a SIM card in a working state from a virtual SIM card to the physical SIM card using a SIM card switching switch when the virtual SIM card is damaged;
  accessing a carrier network using the physical SIM card;
  sending a card number of the virtual SIM to a maintenance website provided by a carrier;
  receiving maintenance data that has a fixed format from a maintenance server to the physical SIM card by sending the card number of the virtual SIM to the maintenance website, the maintenance data comprising an identifier field, and the identifier field identifying that the maintenance data is maintenance data of the virtual SIM card;
  maintaining the virtual SIM card according to the maintenance data, the maintenance data comprising a short message service message having a fixed format, the short message service message carrying the identifier field and a maintenance field;
  detecting that the short message service message having the fixed format comprises the identifier field;
  forwarding the short message service message to a virtual SIM maintenance program according to the identifier field;

decoding content of the short message service message using the virtual SIM card maintenance program to obtain the maintenance field;

maintaining the virtual SIM card according to the maintenance field; and obtaining a current maintenance result from the maintenance website provided by the carrier indicating whether maintenance to the virtual SIM card is a success.

8. The non-transitory computer readable storage medium according to claim 7, wherein before receiving the maintenance data, the method further comprises sending a maintenance request to the maintenance server using the physical SIM card, the maintenance request comprising an identifier of the virtual SIM card and an identifier of the physical SIM card, the identifier of the virtual SIM card being used by the maintenance server to send maintenance data corresponding to the identifier of the virtual SIM card to the mobile terminal corresponding to the physical SIM card, and the identifier of the physical SIM card being used by the maintenance server to send the maintenance data to the mobile terminal corresponding to the identifier of the physical SIM card.

9. The non-transitory computer readable storage medium according to claim 7, wherein after maintaining the virtual SIM card, the method further comprises:

checking that the physical SIM card is removed from the physical SIM card slot;

switching the SIM card in the working state from the physical SIM card to the virtual SIM card using the SIM card switching switch; and accessing the carrier network using the virtual SIM card.

* * * * *

UNITED STATES PATENT AND TRADEMARK OFFICE
CERTIFICATE OF CORRECTION

PATENT NO. : 10,104,535 B2  
APPLICATION NO. : 15/562778  
DATED : October 16, 2018  
INVENTOR(S) : Chaozhi Huang and Li Zhu Page 1 of 1

It is certified that error appears in the above-identified patent and that said Letters Patent is hereby corrected as shown below:

On the Title Page

Page 2, Item (56), FOREIGN PATENT DOCUMENTS, Line 4:
"2012147722" should read "2012174722"

Signed and Sealed this
Fourth Day of December, 2018

Andrei Iancu
*Director of the United States Patent and Trademark Office*